United States Patent
Yoshizaki et al.

(10) Patent No.: US 12,371,757 B2
(45) Date of Patent: Jul. 29, 2025

(54) NON-ORIENTED ELECTRICAL STEEL SHEET AND METHOD FOR MANUFACTURING SAME

(71) Applicant: JFE STEEL CORPORATION, Tokyo (JP)

(72) Inventors: Souichiro Yoshizaki, Tokyo (JP); Yukino Miyamoto, Tokyo (JP); Yoshiaki Zaizen, Tokyo (JP); Kunihiro Senda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 239 days.

(21) Appl. No.: 17/630,506

(22) PCT Filed: Apr. 28, 2020

(86) PCT No.: PCT/JP2020/018201
§ 371 (c)(1),
(2) Date: Jan. 27, 2022

(87) PCT Pub. No.: WO2021/019859
PCT Pub. Date: Feb. 4, 2021

(65) Prior Publication Data
US 2022/0243298 A1    Aug. 4, 2022

(30) Foreign Application Priority Data
Jul. 31, 2019   (JP) .................. 2019-141336

(51) Int. Cl.
*C21D 9/46*   (2006.01)
*C21D 6/00*   (2006.01)
(Continued)

(52) U.S. Cl.
CPC .............. *C21D 9/46* (2013.01); *C21D 6/001* (2013.01); *C21D 6/002* (2013.01); *C21D 6/005* (2013.01);
(Continued)

(58) Field of Classification Search
None
See application file for complete search history.

(56) References Cited

U.S. PATENT DOCUMENTS 7,776,799 B2   8/2010   Raison et al.
8,413,475 B2   4/2013   Genet et al.
(Continued)

FOREIGN PATENT DOCUMENTS

JP   S57192220 A    11/1982
JP   H10645823 B2   6/1994
(Continued)

OTHER PUBLICATIONS

Mar. 4, 2023, Office Action issued by the China National Intellectual Property Administration in the corresponding Chinese Patent Application No. 202080054575.5 with English language search report.
(Continued)

*Primary Examiner* — Xiaobei Wang
(74) *Attorney, Agent, or Firm* — KENJA IP LAW PC

(57) ABSTRACT

Provided is a non-oriented electrical steel sheet having excellent adhesion with an insulating coating even if the thickness of the insulating coating is reduced. The non-oriented electrical steel sheet of the present disclosure has an insulating coating on at least one surface of the steel sheet, where the insulating coating has a P-concentrated layer on both a surface side and an interface side with a steel substrate, and a P concentration of the P-concentrated layer is higher than a P concentration in the steel substrate.

15 Claims, 1 Drawing Sheet

(51) Int. Cl.
  *C21D 8/00* (2006.01)
  *C21D 8/12* (2006.01)
  *C22C 38/00* (2006.01)
  *C22C 38/04* (2006.01)
  *C22C 38/06* (2006.01)
  *C22C 38/08* (2006.01)
  *C22C 38/16* (2006.01)
  *C22C 38/18* (2006.01)
  *C22C 38/34* (2006.01)
  *C23C 10/08* (2006.01)
  *H01F 1/147* (2006.01)

(52) U.S. Cl.
  CPC ............. *C21D 6/008* (2013.01); *C21D 8/005* (2013.01); *C21D 8/1233* (2013.01); *C21D 8/1283* (2013.01); *C22C 38/002* (2013.01); *C22C 38/008* (2013.01); *C22C 38/04* (2013.01); *C22C 38/06* (2013.01); *C22C 38/08* (2013.01); *C22C 38/16* (2013.01); *C22C 38/18* (2013.01); *C22C 38/34* (2013.01); *C23C 10/08* (2013.01); *H01F 1/147* (2013.01); *C22C 2202/02* (2013.01); *Y10T 428/12* (2015.01)

(56) References Cited

U.S. PATENT DOCUMENTS

| | | | |
|---|---|---|---|
| 9,334,405 | B2 | 5/2016 | Yunpeng et al. |
| 10,597,759 | B2 | 3/2020 | Nakanishi et al. |
| 10,665,372 | B2 | 5/2020 | Takeda et al. |
| 10,941,458 | B2 | 3/2021 | Nakajima et al. |
| 11,124,854 | B2 | 9/2021 | Fujimura et al. |
| 2009/0324837 | A1* | 12/2009 | Han ............... C21D 8/1283 427/386 |
| 2016/0203896 | A1* | 7/2016 | Nakanishi ......... C22C 38/002 148/307 |
| 2018/0251899 | A1 | 9/2018 | Terashima et al. |
| 2021/0125759 | A1* | 4/2021 | Yoshizaki ............ H02K 1/02 |
| 2022/0145418 | A1* | 5/2022 | Ichie ............... C21D 8/1233 |
| 2022/0154304 | A1* | 5/2022 | Takahashi ........... H01F 1/147 |

FOREIGN PATENT DOCUMENTS

| | | |
|---|---|---|
| JP | H09157861 A | 6/1997 |
| JP | 2001254126 A | 9/2001 |
| JP | 2001279400 A | 10/2001 |
| JP | 2003213445 A | 7/2003 |
| JP | 2003226948 A | 8/2003 |
| JP | 3603385 B2 | 12/2004 |
| JP | 4010089 B2 | 11/2007 |
| JP | 4023172 B2 | 12/2007 |
| JP | 2011132427 A | 7/2011 |
| JP | 2015040309 A | 3/2015 |
| JP | 2016151050 A | 8/2016 |
| JP | 2017082276 A | 5/2017 |
| JP | 2017141480 A | 8/2017 |
| RU | 2265645 C2 | 12/2005 |
| RU | 2458183 C1 | 8/2012 |
| RU | 2536468 C2 | 12/2014 |
| RU | 2556101 C2 | 7/2015 |
| RU | 2689353 C1 | 5/2019 |
| SU | 1054407 A | 11/1983 |
| WO | 2018164185 A1 | 9/2018 |

OTHER PUBLICATIONS

Jul. 14, 2022, Office Action issued by the Federal Service for Intellectual Property, Patents and Trademarks of the Russian Federation in the corresponding Russian Patent Application No. 2022102469 with English language search report.

Aug. 4, 2020, International Search Report issued in the International Patent Application No. PCT/JP2020/018201.

Kazutoshi Takeda et al., Development of environment-friendly insulating coating for electrical steel sheet with excellent blanking workability and insulation resistance, Materia Japan, 2011, pp. 126-128, vol. 50, No. 3.

Sep. 14, 2021, Notification of Reasons for Refusal issued by the Japan Patent Office in the corresponding Japanese Patent Application No. 2020-546181 with English language Concise Statement of Relevance.

Tatsuhiko Hiratani et al., Development of Si gradient magnetic material JNSF with high saturation magnetic flux density and low high-frequency iron loss, Materia Japan, 2014, pp. 110-112, vol. 53, No. 3.

Yoshikazu Takada et al., Development of 6.5% silicon steel sheet (super E Core), Materia Japan, 1994, pp. 423-425, vol. 33, No. 4 with a partial English translation.

Jul. 29, 2022, the Extended European Search Report issued by the European Patent Office in the corresponding European Patent Application No. 20847077.3.

* cited by examiner

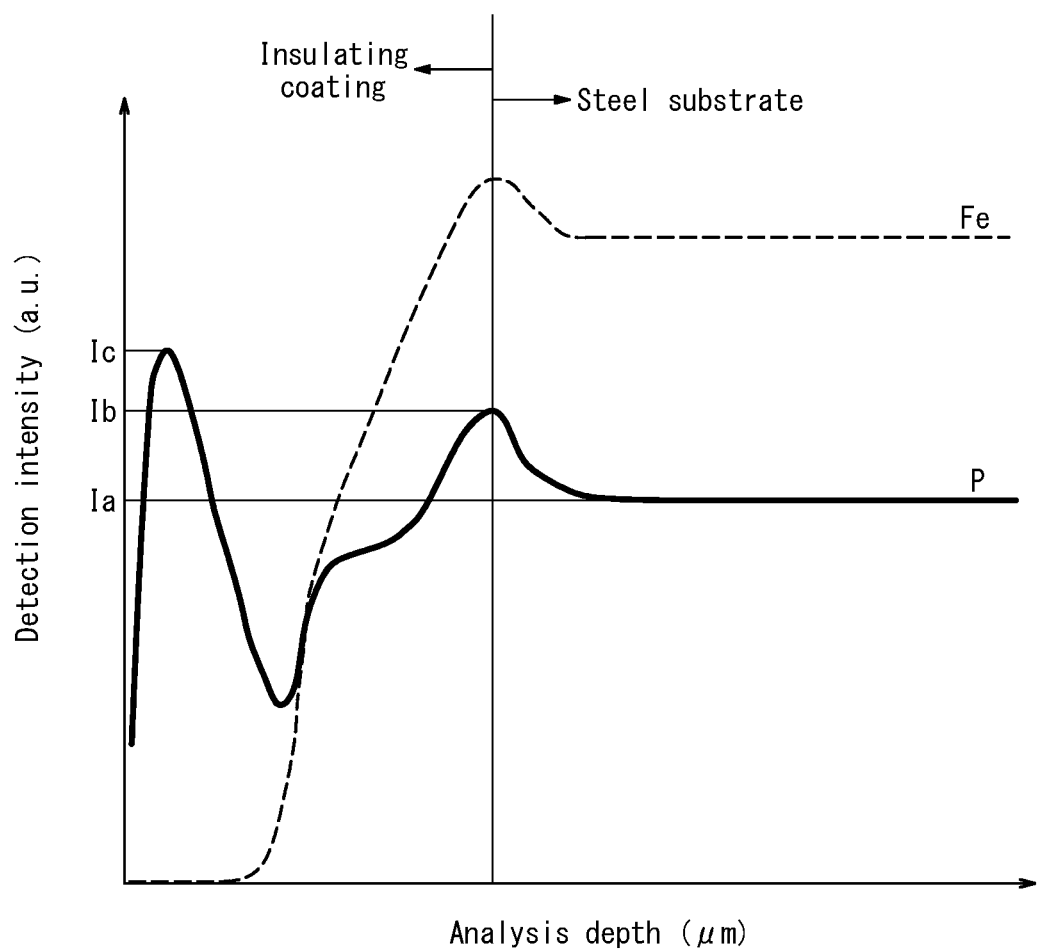

NON-ORIENTED ELECTRICAL STEEL SHEET AND METHOD FOR MANUFACTURING SAME

TECHNICAL FIELD

This disclosure relates to a non-oriented electrical steel sheet and a method for manufacturing the same.

BACKGROUND

A non-oriented electrical steel sheet is a type of soft magnetic material that is widely used as an iron core material for motors and the like. In recent years, practical use of electric vehicles and hybrid vehicles is increasing, the driving system of motors is developing, and the drive frequency of motors is increasing year by year. Nowadays, it is common to achieve a drive frequency of several hundred to several thousand Hz, and the iron loss properties of an iron core in high-frequency ranges are becoming more and more important.

Therefore, it has been tried to reduce iron loss in high-frequency ranges by, for example, adding alloying elements such as Si and Al, or reducing the sheet thickness. Further, technologies for improving the iron loss properties in high-frequency ranges by controlling the Si concentration distribution in the thickness direction and the like have also been studied.

Among these technologies, reduction of thickness significantly improves the iron loss in high-frequency ranges, so that the thickness of electrical steel sheets is being reduced in recent years. On the other hand, reduction of thickness lowers the stacking factor of electrical steel sheets in motor cores manufactured by lamination of electrical steel sheets, which causes problems such as a decrease in torque during the manufacture of motors. The reason is that the relative proportion of the electrical steel sheet part, which excludes insulating coatings, in an iron core decreases as the sheet thickness decreases, even though the thickness of an insulating coating formed on the surface of the steel sheet remains the same. Therefore, it has been desired to further reduce the thickness of the insulating coating formed on the surface of the electrical steel sheet to prevent the stacking factor from decreasing. Various technologies have been studied to reduce the thickness of the insulating coating.

For example, JP3603385B (PTL 1) describes a technology for manufacturing an electrical steel sheet which obtains excellent adhesion of an insulating coating by containing 20 mg/m$^2$ or more and 160 mg/m$^2$ or less of C in the insulating coating.

CITATION LIST

Patent Literature

PTL 1: JP3603385B

SUMMARY

Technical Problem

However, the conventional technologies cannot sufficiently secure the adhesion between a steel sheet and an insulating coating when the thickness of the insulating coating is reduced, and improvement is insufficient in the stacking factor of an electrical steel sheet with a reduced thickness.

It could thus be helpful to provide an electrical steel sheet having excellent adhesion with an insulating coating even if the thickness of the insulating coating is reduced, as well as a manufacturing method thereof.

Solution to Problem

We focused on the concentration state of P (phosphorus) on a surface of an insulating coating and on an interface between an electrical steel sheet and the insulating coating to solve the above problem, and we conducted intensive studies. As a result, we newly found that excellent adhesion of insulating coating can be obtained by concentrating P on both a surface side and an interface side with a steel substrate, which forms an electrical steel sheet, of the insulating coating, thereby completing the present disclosure. We consider the mechanism to be as follows. The coating itself is strengthened by the concentration of P on both the surface side and the interface side with the steel substrate of the insulating coating, and the P concentrated on the interface side with the steel substrate serves as a binder between the steel substrate and the insulating coating. With this effect, an electrical steel sheet having a firm and highly adhesive insulating coating can be obtained even if the thickness of the insulating coating itself is reduced. This effect can be obtained regardless of the type or structure of the insulating coating, whether it is organic, inorganic, or a mixture of the two.

Further, P may be concentrated on the interface side with the steel substrate of the insulating coating by containing 0.005 mass % to 0.20 mass % of P in steel tapping components as typified by a slab and subjecting the slab to final annealing at 1100° C. or higher, or by using a rolling oil containing a phosphoric ester-type emulsifier at a concentration of 1% or more as a rolling oil in final cold rolling to adhere P to the surface of the steel sheet. Furthermore, a P-concentrated layer can be formed on the interface side with the steel substrate of the insulating coating by applying an aqueous solution containing 5 parts by mass or more of a phosphoric acid compound between final annealing and final cold rolling and drying the aqueous solution, thereby obtaining the effect of the present disclosure.

On the other hand, the P-concentrated layer on the surface side of the insulating coating may be formed as follows. When a coating solution added with one part by mass or more of a phosphoric acid compound or the like is used during the formation of the insulating coating, P comes up to the surface of the insulating coating as the solution dries, thereby forming a concentrated layer.

P-concentrated layers are formed on both the surface side and the interface side with the steel substrate of the insulating coating by combining the above. As a result, an electrical steel sheet with excellent coating adhesion can be obtained even if the thickness of the insulating coating is reduced.

We thus provide the following.

(1) A non-oriented electrical steel sheet, which is an electrical steel sheet having an insulating coating on at least one surface of the steel sheet, wherein the insulating coating has a P-concentrated layer on both a surface side and an interface side with a steel substrate, and a P concentration of the P-concentrated layer is higher than a P-concentration in the steel substrate.

(2) The non-oriented electrical steel sheet according to (1), wherein the steel sheet comprises (consists of) a chemical composition containing, in mass %, C: less than 0.010%,
Si: 1.5% or more and 10.0% or less,
Al: 0.001% or more and 2.0% or less, and
Mn: 0.005% or more and 1.0% or less, with the balance being Fe and inevitable impurities.

(3) The non-oriented electrical steel sheet according to (2), wherein the steel sheet further contains, in mass %, P: 0.005% or more and 0.20% or less.

(4) The non-oriented electrical steel sheet according to (2) or (3), wherein the chemical composition further contains, in mass %, at least one selected from the group consisting of Sn: 0.002% or more and 0.10% or less,
Mo: 0.005% or more and 0.10% or less,
Sb: 0.005% or more and 0.30% or less,
Cu: 0.01% or more and 0.50% or less,
Cr: 0.01% or more and 0.50% or less, and
Ni: 0.010% or more and 1.0% or less.

(5) The non-oriented electrical steel sheet according to any one of (1) to (4), wherein the insulating coating has an Fe-concentrated layer on the interface side with the steel substrate.

(6) The non-oriented electrical steel sheet according to any one of (1) to (5), wherein the steel sheet has a thickness of 0.20 mm or less.

(7) The non-oriented electrical steel sheet according to any one of (1) to (6), wherein the steel sheet has a concentration gradient in which a Si concentration decreases from a surface side of the steel sheet toward a center side of the steel sheet, and difference in the Si concentration between a surface layer of the steel sheet and a center layer of the steel sheet in the concentration gradient is 1.0 mass % to 5.0 mass %.

(8) A method for manufacturing a non-oriented electrical steel sheet, which is a method for manufacturing the electrical steel sheet according to any one of (1) to (7), comprising subjecting a slab for the electrical steel sheet to hot rolling, cold rolling, and then final annealing to obtain a final annealed sheet, and forming an insulating coating on a surface of the final annealed sheet, wherein the cold rolling is performed using a rolling oil containing 1% or more of a phosphoric ester-type emulsifier, and
the insulating coating is formed by applying a solution containing one part by mass or more of a phosphoric acid compound.

(9) A method for manufacturing a non-oriented electrical steel sheet, which is a method for manufacturing the electrical steel sheet according to any one of (1) to (7), comprising subjecting a slab for the electrical steel sheet to hot rolling, cold rolling, and then final annealing to obtain a final annealed sheet, and forming an insulating coating on a surface of the final annealed sheet, wherein after the cold rolling and before the final annealing, an aqueous solution containing 5 parts by mass or more of a phosphoric acid compound is applied on a surface of the steel sheet that has undergone the cold rolling, and the aqueous solution is dried, and the insulating coating is formed by applying a solution containing one part by mass or more of a phosphoric acid compound.

(10) A method for manufacturing a non-oriented electrical steel sheet, which is a method for manufacturing the electrical steel sheet according to any one of (1) to (7), comprising subjecting a slab for the electrical steel sheet to hot rolling, cold rolling, and then final annealing to obtain a final annealed sheet, and forming an insulating coating on a surface of the final annealed sheet, wherein the cold rolling is performed using a rolling oil containing 1% or more of a phosphoric ester-type emulsifier,
after the cold rolling and before the final annealing, an aqueous solution containing 5 parts by mass or more of a phosphoric acid compound is applied on a surface of the steel sheet that has undergone the cold rolling, and the aqueous solution is dried, and
the insulating coating is formed by applying a solution containing one part by mass or more of a phosphoric acid compound.

(11) A method for manufacturing a non-oriented electrical steel sheet, which is a method for manufacturing the electrical steel sheet according to any one of (1) to (7), comprising subjecting a slab for the electrical steel sheet to hot rolling, cold rolling, and then final annealing to obtain a final annealed sheet, and forming an insulating coating on a surface of the final annealed sheet, wherein the slab contains 0.005 mass % to 0.20 mass % of P, and
an annealing temperature in the final annealing is set to 1100° C. or higher, and
the insulating coating is formed by applying a solution containing one part by mass or more of a phosphoric acid compound.

(12) A method for manufacturing a non-oriented electrical steel sheet, wherein in the method for manufacturing an electrical steel sheet according to (11), the cold rolling is performed using a rolling oil containing 1% or more of a phosphoric ester-type emulsifier.

(13) A method for manufacturing a non-oriented electrical steel sheet, wherein in the method for manufacturing an electrical steel sheet according to (11) or (12), after the cold rolling and before the final annealing, an aqueous solution containing 5 parts by mass or more of a phosphoric acid compound is applied on a surface of the steel sheet that has undergone the cold rolling, and the aqueous solution is dried.

(14) A method for manufacturing a non-oriented electrical steel sheet according to any one of (8) to (13), comprising subjecting a slab for the electrical steel sheet to hot rolling, cold rolling, and then final annealing to obtain a final annealed sheet, and forming an insulating coating on a surface of the final annealed sheet, wherein a siliconizing treatment is performed after the final annealing, or the final annealing is final annealing that also serves as a siliconizing treatment.

Advantageous Effect

The non-oriented electrical steel sheet according to the present disclosure has an insulating coating whose coating adhesion is not deteriorated even if the thickness is reduced, regardless of the type of the insulating coating. Therefore, it is possible to improve the decreasing of stacking factor, which has been a problem of electrical steel sheets with a reduced thickness.

BRIEF DESCRIPTION OF THE DRAWINGS

In the accompanying drawings:

FIG. 1 illustrates the GDS measurement profile of an example of the present disclosure.

DETAILED DESCRIPTION

In the non-oriented electrical steel sheet with an insulating coating of the present disclosure, the insulating coating has a structure as described below. An electrical steel sheet that serves as a base sheet of the insulating coating is not particularly limited and may follow the general practice for electrical steel.

[The Insulating Coating has a P-concentrated Layer on Both a Surface Side and an Interface Side with a Steel Substrate, where the P-concentrated Layer has a P Concentration Higher than that in the Steel Substrate]

By concentrating P on both a surface side and an interface side with a steel substrate of the insulating coating, the coating is strengthened, and the P concentrated on the interface side with the steel substrate serves as a binder between the insulating coating and the steel substrate. With this effect, an electrical steel sheet having a firm and highly adhesive insulating coating can be obtained even if the thickness of the insulating coating itself is reduced.

The concentration of P in the insulating coating can be evaluated using glow discharge spectroscopy (GDS). The GDS evaluation in this embodiment was performed under conditions of Ar gas pressure of 600 Pa and high-frequency output of 35 W using GDS-Profiler 2 manufactured by HORIBA, Ltd. However, any equipment may be used as long as it can perform the same evaluation. The presence or absence of a P-concentrated layer can be determined as follows.

FIG. 1 illustrates an example of the result of GDS profile measurement of P and Fe on a steel sheet with an insulating coating that satisfies the requirements of the present disclosure. First, the interface side with the steel substrate of the insulating coating is a region in which the Fe intensity decreases rapidly toward the surface side of the insulating coating (in other words, the left of the analysis depth in the graph in FIG. 1). As used herein, the broad detection intensity of P in the steel substrate region is indicated as Ia, the peak value of the detection intensity of P at the interface side with the steel substrate in the insulating coating is indicated as Ib, and the peak value of the detection intensity of P at the surface side of the insulating coating is indicated as Ic. The P-concentrated layer on the interface side with the steel substrate of the insulating coating is a layer that satisfies the following equation (1), and the P-concentrated layer on the surface side of the insulating coating is a layer that satisfies the following equation (2). Note that the "P concentration in the steel substrate" is "Ia" described above. Therefore, the concentration of P is defined as satisfying both the following equation (1) and equation (2).

$$Ib > Ia \quad (1)$$

$$Ic > Ia \quad (2)$$

[Thickness and Composition of the Insulating Coating]

The thickness of the insulating coating is preferably 2.0 µm or less. The stacking factor increases as the coating thickness reduces, and therefore the thickness is more preferably 1.0 µm or less. There is no preferred lower limit to the coating thickness, and the thickness may be as small as possible to ensure insulation between layers depending on the type of insulating coating to be formed. The insulating coating may be formed of only organic components, only inorganic components, or organic/inorganic composite materials. Specific examples of the organic component include acryl-based resins, acrylic silicon-based resins, polyester-based resins, epoxy-based resins, and fluorine-based resins. Examples of the inorganic component include chromate-based ones, bichromate-based ones, borate-based ones, and silicate-based ones. Examples of the organic/inorganic composite material (semi-organic) include a mixture of the organic component and the inorganic component mentioned above.

The chemical composition of the non-oriented electrical steel sheet of the present disclosure may follow the general practice of an electrical steel sheet, and a suitable chemical composition is described below.

C: Less than 0.010 Mass %

C causes magnetic aging and deteriorates the magnetic properties. Therefore, the C content is desirably as low as possible. However, excessive reduction of the C content leads to an increase in manufacturing costs. Therefore, the C content is preferably less than 0.010 mass %, with which magnetic aging causes no practical problem. The C content is more preferably less than 0.0050 mass %.

Si: 1.5 Mass % or More and 10.0 Mass % or Less

Si is an element that increases the specific resistance of steel and improves the iron loss properties. In the present disclosure, it is preferable to contain 1.5 mass % or more of Si to obtain the effect of improving the iron loss properties. However, when the Si content exceeds 10.0 mass %, the saturation magnetic flux density is significantly decreased, resulting in a large drop in torque during the manufacture of motors. Therefore, in the present disclosure, the Si content is preferably 1.5 mass % or more and more preferably 2.0 mass % or more, and the Si content is preferably 10.0 mass % or less and more preferably 7.0 mass % or less. The Si content is more preferably in a range of 1.5 mass % to 10.0 mass % and still more preferably in a range of 2.0 mass % to 7.0 mass %. As used herein, the Si content is an average value of the Si content for thickness direction.

Al: 0.001 Mass % or More and 2.0 Mass % or Less

Al, like Si, increases the specific resistance of steel and is therefore an element effective in improving iron loss. On the other hand, excessive addition of Al not only decreases the saturation magnetic flux density but also causes precipitation of MN because Al combines with N in the steel or N caused by nitriding of the steel sheet during stress relief annealing. Therefore, the Al content is preferably 2.0 mass % or less and more preferably 0.50 mass % or less. To achieve an increase in specific resistance that is effective in improving iron loss, the Al content is preferably 0.001 mass % or more and more preferably 0.002 mass % or more. The Al content is still more preferably 0.002 mass % to 0.50 mass %.

Mn: 0.005 Mass % or More and 1.0 Mass % or Less

To improve the workability during hot rolling, the Mn content is preferably 0.005 mass % or more, the Mn content is preferably 1.0 mass % or less, and the Mn content is more preferably in a range of 0.005 mass % to 1.0 mass %. The reason is that, when the Mn content is less than 0.005 mass %, the above-mentioned effect of improving workability is small; on the other hand, when the Mn content exceeds 1.0 mass %, the saturation magnetic flux density decreases. The Mn content is more preferably 0.01 mass % or more. The Mn content is more preferably 0.30 mass % or less. The Mn content is still more preferably 0.010 mass % to 0.30 mass %.

P: 0.005 Mass % or More and 0.20 Mass % or Less

As will be described later, adding P to a slab and performing heat treatment is one of the means to form a P-concentrated layer on the interface side with the steel substrate in the insulating coating. In addition to the effect on the coating, P also works effectively to improve the texture and improve the magnetic properties by increasing the specific resistance. Therefore, the P content is preferably 0.005 mass % or more. The P content is preferably 0.030 mass % or more. On the other hand, when the P content exceeds 0.20 mass %, embrittlement occurs rapidly, which deteriorates the manufacturability and the workability. Therefore, the P content is preferably 0.20 mass % or less. The P content is preferably 0.10 mass % or less. The P content is more preferably 0.030 mass % to 0.10 mass %.

Examples of means to form a P-concentrated layer on the interface side with the steel substrate in the insulating coating include using a rolling oil containing a phosphoric ester-type emulsifier, or applying an aqueous solution containing a phosphoric acid compound on the surface of the steel sheet and drying the aqueous solution. In this case, it is not always necessary to contain P in the slab. However, even in this case, it is preferable to add P in an amount of 0.001 mass % or more, it is preferable to add Pin an amount of 0.10 mass % or less, and it is more preferable to add P in an amount of 0.001 mass % to 0.10 mass % in order to improve the texture.

The following components may be added as necessary in addition to the suitable basic components mentioned above. Sn: 0.002 mass % or more and 0.10 mass % or less; Mo: 0.005 mass % or more and 0.10 mass % or less; Sb: 0.005 mass % or more and 0.30 mass % or less; Cu: 0.01 mass % or more and 0.50 mass % or less; Cr: 0.01 mass % or more and 0.50 mass % or less; and Ni: 0.010 mass % or more and 1.0 mass % or less All of the above components are effective elements that are added to improve the magnetic properties, so that it is more desirable to add at least one of the above elements at an amount equal to or higher than the lower limit of each element. However, excessive addition leads to deterioration of magnetic properties and deterioration of manufacturability, so that it is desirable to add the element within a range up to the upper limit of each element.

[Having an Fe-Concentrated Layer on the Interface Side with the Steel Substrate of the Insulating Coating]

As illustrated in the example in FIG. 1, by concentrating Fe as well as P on the interface side with the steel substrate of the insulating coating, a compound of Fe and P serves as a binder between the steel substrate and the insulating coating, resulting in an insulating coating formed more firmly on the electrical steel sheet. The presence or absence of Fe concentration can be evaluated by GDS. When the difference between the analysis depth at which the peak intensity of Fe is obtained and the analysis depth at which the peak intensity of P, that is, Ib, is obtained is 0.5 μm or less, it is considered there is an Fe-concentrated layer on the interface side with the steel substrate of the insulating coating.

[Thickness of the Electrical Steel Sheet]

The stacking factor decreases as the sheet thickness decreases, which causes problems. Therefore, the effect of the present disclosure is easily obtained when the sheet thickness is 0.25 mm or less. The present disclosure is more effective when the sheet thickness is 0.20 mm or less. From the viewpoint of the effect, there is no need to set a lower limit on the sheet thickness. However, when the sheet thickness is 0.05 mm or less, the costs of blanking and the like involved in the manufacture of cores significantly increase. Therefore, it is desirable to have a thickness of more than 0.05 mm.

As used herein, the "thickness of the electrical steel sheet" or simply the "sheet thickness" includes the thickness of the insulating coating.

[Having a Concentration Gradient in which the Si Concentration Decreases from the Surface Side of the Steel Sheet Toward the Center Side of the Steel Sheet, where the Difference in Si Concentration Between the Surface Layer of the Steel Sheet and the Center Layer of the Steel Sheet in the Concentration Gradient is 1.0 Mass % to 5.0 Mass %]

Having a Si concentration gradient in the thickness direction of the steel sheet can improve the iron loss at high frequencies. The concentration gradient can be achieved, for example, by performing a siliconizing treatment in a $SiCl_4$-containing atmosphere, or by a manufacturing method using cladding in which materials with different Si concentrations are stacked and used. The lower limit of the Si concentration difference is preferably 1.0 mass % and more preferably 1.5 mass % to sufficiently obtain the effect of improving eddy current loss. The upper limit of the Si concentration difference is preferably 5.0 mass % and more preferably 3.5 mass % to suppress the deterioration of hysteresis loss. The Si concentration difference is still more preferably 1.5% to 3.5%.

The "surface layer of the steel sheet" and the "center layer of the steel sheet" are specifically defined as follows. The "surface layer of the steel sheet" is a region of ⅓ sheet thickness from each of the two surfaces of the steel sheet (excluding the insulating coating), and the "center layer of the steel sheet" is a region of the remaining ⅓ sheet thickness. The Si concentration in the center layer of the steel sheet is the average concentration in the corresponding region, and the Si concentration in the surface layer of the steel sheet is the average of the average concentrations in the corresponding regions of the two surfaces (in other words, the average concentration of the two surface layers). The above average concentration can be evaluated from the concentration profile by measuring the Si concentration in the thickness direction using EPMA.

[Manufacturing Method]

The electrical steel sheet of the present disclosure can be manufactured by subjecting a slab for electrical steel sheet to hot rolling, cold rolling, and then final annealing to obtain a final annealed sheet, and forming an insulating coating on a surface of the final annealed sheet in accordance with a conventional method.

[Method for Forming a P-concentrated Layer on the Interface Side with the Steel Substrate in the Insulating Coating]

Any of the following treatments is required in the above manufacturing process to form a concentrated layer of P on the interface side with the steel substrate in the insulating coating.

Using a rolling oil containing 1% or more of a phosphoric ester-type emulsifier during cold rolling After the cold rolling and before the final annealing (or siliconizing treatment), applying an aqueous solution containing 5 parts by mass or more of a phosphoric acid compound on the surface of the steel sheet that has undergone the cold rolling, and drying the aqueous solution Containing 0.005 mass % or more and 0.20 mass % or less of P in the slab, and setting the annealing temperature in the final annealing to 1100° C. or higher

[Method for Forming a P-concentrated Layer on the Surface Side of the Insulating Coating]

Further, the following treatment is necessary in order to form a P-concentrated layer on the surface side of the insulating coating.

During the formation of the insulating coating, applying a solution containing one part by mass or more of a phosphoric acid compound

[Siliconizing Treatment]

To obtain the Si concentration difference, the steel sheet may be further subjected to a siliconizing treatment after final annealing, or for reasons of cost reduction, the final annealing may be final annealing which also serves as a siliconizing treatment. Mixed gas of silicon tetrachloride and nitrogen may be used as the atmosphere gas in the case of performing a siliconizing treatment. When the siliconizing treatment is performed, the heat treatment temperature is desirably 1100° C. to 1300° C., and the annealing time is desirably 30 seconds to 120 seconds depending on the required amount of silica immersion.

[Method for Forming an Fe-Concentrated Layer]

The siliconizing treatment temperature or the final annealing temperature is preferably 1000° C. or higher to form an Fe-concentrated layer in the insulating coating. It is preferably 1300° C. or lower because it is necessary to avoid coarsening of particle size for the reasons of reduction of eddy current loss at high frequencies.

EXAMPLES

Example 1

Slabs having the components listed in Table 1 were heated to 1200° C. and subjected to hot rolling to obtain hot-rolled sheets of 1.8 mm. Next, the hot-rolled sheets were subjected to annealing at 1050° C. and then to cold rolling so that each sheet was rolled to the sheet thicknesses (product sheet thickness) listed in Table 1. In some cases, a rolling oil containing 1% of ADEKA COL PS807 as a phosphoric ester-type emulsifier (defined as "rolling oil A") was used during cold rolling, and in other cases, a general cold rolling oil for steel (defined as "rolling oil B"), which contained no phosphoric ester-type emulsifier, was used. In some cases, a pretreatment was further performed where Al phosphate, which was used as an aqueous solution containing 5 parts by mass or more of a phosphoric acid compound, was applied and dried after cold rolling and before final annealing, and whether or not the pretreatment was performed was indicated as "Yes" or "No" in the "Annealing pretreatment" column of Table 1.

Next, final annealing was performed at 1000° C. for 10 seconds in a 20% $H_2$-80% $N_2$ dry atmosphere. In Table 1, Nos. 21, 23 and 24 were subjected to final annealing under conditions of 1100° C.×10 seconds, and No. 25 was subjected to final annealing under conditions of 950° C.×10 seconds.

To form an insulating coating, an organic/inorganic composite coating solution containing chromic acid and acrylic resin was added with one part by mass of Mg phosphate, and the solution was applied to each sheet. Next, the sheets were baked at 300° C. to obtain electrical steel sheet products. Note that, for comparison, only No. 22 in Table 1 did not have Mg phosphate added to the coating solution. The stacking factor, adhesion of insulating coating (peeling of coating), and iron loss $W_{10/1000}$ of the electrical steel sheet products thus obtained were evaluated. The stacking factor was evaluated with the method according to JIS C 2550-5, and the magnetic properties were evaluated with the method according to JIS C 2550-1. The evaluation of the adhesion of insulating coating was performed according to JIS K 5600-5-6 (cross-cut method). Six cut lines were made at intervals of 1 mm on the surface of the steel sheet with a cutting knife, cellophane adhesive tape was attached thereon, and then the peeling state of the coating was evaluated by tearing off the tape. When the ratio of the peeled area to the area of the cross-cut portion was less than 10%, the adhesion was evaluated as good. When the ratio was 10% or more, the adhesion was evaluated as poor. Further, the coating structure on the surface of the steel sheet was evaluated by GDS to determine whether or not both the above equations 1 and 2 were satisfied. Those that satisfied both were evaluated as "good", and those that did not satisfy either were evaluated by "poor". Furthermore, it was considered to have an Fe-concentrated layer (Fe peak: yes) when there was a peak intensity of Fe and the difference in depth between the peak intensity of Fe and the peak intensity of P, that is, Ib, was 0.5 μm or less.

TABLE 1

| Steel sample | | Component (mass %) | | | | | | Roll-ing oil | Product sheet thickness (mm) | An-nealing pretreat-ment | An-nealing temper-ature (°C) | Addition of Mg phosphate to insulating coating | Thickness of insulating coating (μm) | GDS evaluation result | | | | | Material test | | | Remarks |
|---|---|---|---|---|---|---|---|---|---|---|---|---|---|---|---|---|---|---|---|---|---|---|
| No. | ID | C | Si | Al | Mn | P | Others | | | | | | | Ia | Ib | Ic | Coating structure | Fe peak | Stacking factor (%) | Peeling of coating | Iron loss $W_{10/1000}$ (W/kg) | |
| 1 | A | 0.0025 | 3.4 | 0.50 | 0.20 | 0.008 | — | A | 0.20 | No | 1000 | Yes | 1.5 | 0.032 | 0.034 | 0.096 | Good | Yes | 97.2 | Good | 43.5 | Example |
| 2 | A | 0.0025 | 3.4 | 0.50 | 0.20 | 0.008 | — | A | 0.20 | No | 1000 | Yes | 1.0 | 0.018 | 0.024 | 0.032 | Good | Yes | 97.6 | Good | 43.2 | Example |
| 3 | A | 0.0025 | 3.4 | 0.50 | 0.20 | 0.008 | — | A | 0.20 | No | 1000 | Yes | 0.5 | 0.032 | 0.078 | 0.092 | Good | Yes | 98.0 | Good | 43.1 | Example |
| 4 | A | 0.0025 | 3.4 | 0.50 | 0.20 | 0.008 | — | B | 0.20 | No | 1000 | Yes | 0.5 | 0.022 | 0.020 | 0.042 | Poor | Yes | 97.9 | Poor | 43.3 | Comparative Example |
| 5 | A | 0.0025 | 3.4 | 0.50 | 0.20 | 0.008 | — | A | 0.20 | Yes | 1000 | Yes | 0.5 | 0.072 | 0.099 | 0.171 | Good | Yes | 98.1 | Good | 43.2 | Example |
| 6 | B | 0.0030 | 2.8 | 0.30 | 0.10 | 0.10 | Sn:0.040 | B | 0.20 | No | 1000 | Yes | 0.5 | 0.398 | 0.355 | 0.856 | Poor | Yes | 97.9 | Poor | 50.1 | Comparative Example |
| 7 | B | 0.0030 | 2.8 | 0.30 | 0.10 | 0.10 | Sn:0.040 | A | 0.20 | No | 1000 | Yes | 0.5 | 0.351 | 0.492 | 0.712 | Good | Yes | 97.9 | Good | 49.8 | Example |
| 8 | C | 0.0010 | 3.8 | 0.020 | 0.050 | 0.050 | Cr:0.01, Sb:0.020 | B | 0.20 | No | 1000 | Yes | 1.0 | 0.218 | 0.209 | 0.465 | Poor | Yes | 97.6 | Poor | 44.5 | Comparative Example |
| 9 | C | 0.0010 | 3.8 | 0.020 | 0.050 | 0.050 | Cr:0.01, Sb:0.020 | A | 0.20 | Yes | 1000 | Yes | 0.3 | 0.135 | 0.165 | 0.311 | Good | Yes | 98.3 | Good | 43.2 | Example |
| 10 | A | 0.0025 | 3.4 | 0.50 | 0.20 | 0.008 | — | A | 0.10 | No | 1000 | Yes | 1.5 | 0.096 | 0.117 | 0.215 | Good | Yes | 95.0 | Good | 31.5 | Example |
| 11 | A | 0.0025 | 3.4 | 0.50 | 0.20 | 0.008 | — | A | 0.10 | No | 1000 | Yes | 0.5 | 0.053 | 0.087 | 0.090 | Good | Yes | 96.6 | Good | 31.2 | Example |
| 12 | A | 0.0025 | 3.4 | 0.50 | 0.20 | 0.008 | — | B | 0.10 | No | 1000 | Yes | 2.0 | 0.053 | 0.050 | 0.104 | Poor | Yes | 95.0 | Poor | 32.6 | Comparative Example |
| 13 | D | 0.0035 | 5.8 | 0.003 | 0.020 | 0.005 | — | A | 0.10 | No | 1000 | Yes | 1.5 | 0.036 | 0.041 | 0.051 | Good | Yes | 95.4 | Good | 23.4 | Example |
| 14 | E | 0.0300 | 1.8 | 0.60 | 0.40 | 0.010 | Cu:0.10, Mo:0.010 | A | 0.10 | No | 1000 | Yes | 1.0 | 0.064 | 0.094 | 0.168 | Good | Yes | 96.2 | Good | 37.8 | Example |
| 15 | F | 0.0010 | 3.0 | 0.10 | 0.010 | 0.070 | Ni:0.020 | A | 0.10 | No | 1000 | Yes | 0.3 | 0.283 | 0.430 | 0.574 | Good | Yes | 97.1 | Good | 36.4 | Example |
| 16 | F | 0.0010 | 3.0 | 0.10 | 0.010 | 0.070 | Ni:0.020 | B | 0.10 | No | 1000 | Yes | 0.3 | 0.269 | 0.025 | 0.576 | Poor | Yes | 96.7 | Poor | 38.4 | Comparative Example |
| 17 | G | 0.0020 | 4.6 | 0.60 | 0.20 | 0.10 | Sn:0.010, Sb:0.020 | A | 0.10 | Yes | 1000 | Yes | 0.3 | 0.328 | 0.443 | 0.705 | Good | Yes | 97.3 | Good | 26.8 | Example |
| 18 | H | 0.0010 | 1.4 | 0.60 | 0.40 | 0.050 | — | A | 0.20 | No | 1000 | Yes | 0.5 | 0.152 | 0.206 | 0.332 | Good | Yes | 97.4 | Good | 58.3 | Example |
| 19 | I | 0.0020 | 3.1 | 0.80 | 0.20 | 0.004 | Sn:0.050 | B | 0.20 | No | 1000 | Yes | 0.4 | 0.086 | 0.083 | 0.172 | Poor | Yes | 97.1 | Poor | 44.5 | Comparative Example |
| 20 | I | 0.0020 | 3.1 | 0.80 | 0.20 | 0.004 | Sn:0.050 | B | 0.20 | No | 1000 | Yes | 0.4 | 0.086 | 0.105 | 0.168 | Good | Yes | 97.1 | Good | 43.5 | Example |
| 21 | C | 0.0010 | 3.8 | 0.020 | 0.050 | 0.050 | Cr:0.01, Sb:0.020 | A | 0.20 | No | 1100 | Yes | 1.0 | 0.225 | 0.302 | 0.475 | Good | Yes | 97.7 | Good | 42.5 | Example |
| 22 | G | 0.0020 | 4.6 | 0.60 | 0.20 | 0.10 | Sn:0.010, Sb:0.020 | A | 0.10 | Yes | 1000 | No | 0.3 | 0.327 | 0.444 | 0.165 | Poor | Yes | 97.3 | Poor | 28.7 | Comparative Example |
| 23 | A | 0.0025 | 3.4 | 0.50 | 0.20 | 0.008 | — | A | 0.10 | No | 1100 | Yes | 2.0 | 0.055 | 0.056 | 0.104 | Good | Yes | 95.1 | Good | 32.1 | Example |
| 24 | D | 0.0035 | 5.8 | 0.003 | 0.020 | 0.005 | — | A | 0.10 | Yes | 1100 | Yes | 1.5 | 0.039 | 0.044 | 0.051 | Good | Yes | 95.6 | Good | 23.1 | Example |
| 25 | D | 0.0035 | 5.8 | 0.003 | 0.020 | 0.005 | — | A | 0.10 | Yes | 950 | Yes | 1.5 | 0.038 | 0.044 | 0.054 | Good | No | 95.1 | Good | 23.5 | Example |

*The underlined part is outside the scope of the present disclosure.

Table 1 lists the results. When a pretreatment was performed in which, in addition to the application of an organic/inorganic composite coating solution containing one part by mass of Mg phosphate, a rolling oil containing 1% of ADEKA COL PS807 as a phosphoric ester-type emulsifier was used, and Al phosphate as an aqueous solution containing 5 parts by mass or more of a phosphoric acid compound was applied and dried after cold rolling and before final annealing, or when a slab containing 0.005 mass % or more and 0.20 mass % or less of P was used and final annealing was performed at 1100° C. or higher, a coating structure satisfying both the equations 1 and 2 was obtained, resulting in good test results in terms of peeling of coating.

Example 2

Slabs having the components listed in Table 2 were heated to 1200° C. and subjected to hot rolling to obtain hot-rolled sheets of 1.7 mm. Next, the hot-rolled sheets were subjected to annealing at 1050° C. and then to cold rolling so that each sheet was rolled to the sheet thicknesses (product sheet thickness) listed in Table 2. A rolling oil containing 1% of ADEKA COL PS807 as a phosphoric ester-type emulsifier (rolling oil A) was used during cold rolling. Next, the cold-rolled sheets were subjected to heat treatment at 1200° C. for 60 seconds in silicon tetrachloride+$N_2$ gas to perform final annealing that also served as a siliconizing treatment. In the siliconizing treatment, the Si concentration in the surface layer of the steel sheet (Si concentration of surface layer) was controlled by controlling the flow rate of silicon tetrachloride gas in the furnace. The Si concentration gradient in the thickness direction was confirmed by EPMA. Steel sheets were obtained which had a Si concentration gradient where the Si concentration was the same as that of components of base materials in the center layer of the steel sheet, which was on the center side of the steel sheet, and the Si concentration decreased from the surface side of the steel sheet toward the center side of the steel sheet in the thickness direction.

Further, an inorganic composite coating solution mainly composed of Al phosphate was added with one part by mass of Mg phosphate, and the solution was applied on each steel sheet. Next, the steel sheets were baked at 320° C. to obtain electrical steel sheet products. The electrical steel sheet products thus obtained were evaluated in the same manner as in Example 1, and the results of the evaluation are summarized in Table 2.

TABLE 2

| No. | Component (mass %) | | | | | | Product sheet thickness (mm) | Si concentration of surface layer (mass %) | Si concentration difference (mass %) |
|---|---|---|---|---|---|---|---|---|---|
| | C | Si | Al | Mn | P | Others | | | |
| 1 | 0.0025 | 3.4 | 0.50 | 0.20 | 0.008 | — | 0.20 | 6.5 | 3.1 |
| 2 | 0.0700 | 2.7 | 0.10 | 0.10 | 0.050 | Sn:0.020, Sb:0.050 | 0.20 | 6.5 | 3.8 |
| 3 | 0.0700 | 2.7 | 0.10 | 0.10 | 0.050 | Sn:0.020, Sb:0.050 | 0.20 | 6.5 | 3.8 |
| 4 | 0.0700 | 2.7 | 0.10 | 0.10 | 0.050 | Sn:0.020, Sb:0.050 | 0.20 | 2.7 | 0.0 |
| 5 | 0.0230 | 2.5 | 0.005 | 0.10 | 0.10 | Cu:0.02 | 0.25 | 4.2 | 1.7 |
| 6 | 0.0230 | 2.5 | 0.005 | 0.10 | 0.10 | Cu:0.02 | 0.25 | 2.5 | 0.0 |
| 7 | 0.0025 | 3.4 | 0.50 | 0.20 | 0.008 | — | 0.10 | 6.5 | 3.1 |
| 8 | 0.0025 | 3.4 | 0.50 | 0.20 | 0.008 | — | 0.10 | 6.5 | 3.1 |
| 9 | 0.0010 | 2.4 | 1.0 | 0.20 | 0.030 | Ni:0.080 | 0.10 | 4.0 | 1.6 |
| 10 | 0.0010 | 2.4 | 1.0 | 0.20 | 0.030 | Ni:0.080 | 0.10 | 4.5 | 2.1 |

| No. | Thickness of insulating coating (μm) | GDS evaluation result | | | | Material test | | | Remarks |
|---|---|---|---|---|---|---|---|---|---|
| | | Ia | Ib | Ic | Coating structure | Stacking factor (%) | Peeling of coating | Iron loss $W_{10/1000}$ (W/kg) | |
| 1 | 1.0 | 0.092 | 0.122 | 0.239 | Good | 97.5 | Good | 40.3 | Example |
| 2 | 0.5 | 0.208 | 0.315 | 0.424 | Good | 97.8 | Good | 38.4 | Example |
| 3 | 1.0 | 0.195 | 0.291 | 0.440 | Good | 97.4 | Good | 38.6 | Example |
| 4 | 1.0 | 0.206 | 0.275 | 0.422 | Good | 97.7 | Good | 50.3 | Example |
| 5 | 0.5 | 0.414 | 0.539 | 0.849 | Good | 98.7 | Good | 40.6 | Example |
| 6 | 0.5 | 0.337 | 0.438 | 0.684 | Good | 98.6 | Good | 53.7 | Example |
| 7 | 1.0 | 0.091 | 0.176 | 0.170 | Good | 97.5 | Good | 25.4 | Example |
| 8 | 0.2 | 0.114 | 0.099 | 0.241 | Good | 98.1 | Good | 25.1 | Example |
| 9 | 0.5 | 0.091 | 0.107 | 0.223 | Good | 98.1 | Good | 25.7 | Example |
| 10 | 0.5 | 0.175 | 0.254 | 0.378 | Good | 98.1 | Good | 24.9 | Example |

Table 2 lists the results. As in Example 1, good test results in terms of peeling of coating were obtained in non-oriented electrical steel sheets with a coating structure that satisfied both the equations 1 and 2. Further, iron loss was improved by obtaining a Si concentration difference of 1.0 mass % to 5.0 mass % through the siliconizing treatment.

The invention claimed is:

1. A non-oriented electrical steel sheet comprising an insulating coating on at least one surface of the steel sheet, wherein
the insulating coating has a P-concentrated layer on both a surface side and an interface side with a steel substrate,
a P concentration of the P-concentrated layer is higher than a P concentration in the steel substrate,
the steel sheet has a thickness of 0.20 mm or less and a concentration gradient in which a Si concentration decreases from a surface side of the steel sheet toward a center side of the steel sheet, and
difference in the Si concentration between a surface layer of the steel sheet and a center layer of the steel sheet in the concentration gradient is 1.0 mass % to 5.0 mass %.

2. The non-oriented electrical steel sheet according to claim 1,
wherein the steel sheet comprises a chemical composition containing, in mass %,
C: less than 0.010%,
Si: 1.5% or more and 10.0% or less,
Al: 0.001% or more and 2.0% or less, and
Mn: 0.005% or more and 1.0% or less, with the balance being Fe and inevitable impurities.

3. The non-oriented electrical steel sheet according to claim 2, wherein the steel sheet further contains, in mass %,
P: 0.005% or more and 0.20% or less.

4. The non-oriented electrical steel sheet according to claim 2, wherein the chemical composition further contains, in mass %, at least one selected from the group consisting of
Sn: 0.002% or more and 0.10% or less,
Mo: 0.005% or more and 0.10% or less,
Sb: 0.005% or more and 0.30% or less,
Cu: 0.01% or more and 0.50% or less,
Cr: 0.01% or more and 0.50% or less, and
Ni: 0.010% or more and 1.0% or less.

5. The non-oriented electrical steel sheet according to claim 3, wherein the chemical composition further contains, in mass %, at least one selected from the group consisting of
Sn: 0.002% or more and 0.10% or less,
Mo: 0.005% or more and 0.10% or less,
Sb: 0.005% or more and 0.30% or less,
Cu: 0.01% or more and 0.50% or less,
Cr: 0.01% or more and 0.50% or less, and
Ni: 0.010% or more and 1.0% or less.

6. The non-oriented electrical steel sheet according to claim 1, wherein the insulating coating has an Fe-concentrated layer on the interface side with the steel substrate.

7. The non-oriented electrical steel sheet according to claim 1, wherein the insulating coating is formed from a coating solution containing one part or more by mass of Mg phosphate.

8. The non-oriented electrical steel sheet according to claim 1, wherein the insulating coating is formed of a component selected from a group consisting of acryl-based resins, acrylic silicon-based resins, fluorine-based resins, chromate, bichromate, borate, silicate, and a mixture thereof.

9. A method for manufacturing the non-oriented electrical steel sheet according to claim 1, comprising subjecting a slab for the electrical steel sheet to hot rolling, cold rolling, and then final annealing to obtain a final annealed sheet, and forming an insulating coating on a surface of the final annealed sheet, wherein
the cold rolling is performed using a rolling oil containing 1% or more of a phosphoric ester-type emulsifier,
the insulating coating is formed by applying a solution containing one part by mass or more of a phosphoric acid compound, and
a siliconizing treatment is performed after the final annealing, or the final annealing is final annealing that also serves as a siliconizing treatment.

10. A method for manufacturing the non-oriented electrical steel sheet according to claim 1, comprising subjecting a slab for the electrical steel sheet to hot rolling, cold rolling, and then final annealing to obtain a final annealed sheet, and forming an insulating coating on a surface of the final annealed sheet, wherein
after the cold rolling and before the final annealing, an aqueous solution containing 5 parts by mass or more of a phosphoric acid compound is applied on a surface of the steel sheet that has undergone the cold rolling, and the aqueous solution is dried,
the insulating coating is formed by applying a solution containing one part by mass or more of a phosphoric acid compound, and
a siliconizing treatment is performed after the final annealing, or the final annealing is final annealing that also serves as a siliconizing treatment.

11. A method for manufacturing the non-oriented electrical steel sheet according to claim 1, comprising subjecting a slab for the electrical steel sheet to hot rolling, cold rolling, and then final annealing to obtain a final annealed sheet, and forming an insulating coating on a surface of the final annealed sheet, wherein
the cold rolling is performed using a rolling oil containing 1% or more of a phosphoric ester-type emulsifier,
after the cold rolling and before the final annealing, an aqueous solution containing 5 parts by mass or more of a phosphoric acid compound is applied on a surface of the steel sheet that has undergone the cold rolling, and the aqueous solution is dried,
the insulating coating is formed by applying a solution containing one part by mass or more of a phosphoric acid compound, and
a siliconizing treatment is performed after the final annealing, or the final annealing is final annealing that also serves as a siliconizing treatment.

12. A method for manufacturing the non-oriented electrical steel sheet according to claim 1, comprising subjecting a slab for the electrical steel sheet to hot rolling, cold rolling, and then final annealing to obtain a final annealed sheet, and forming an insulating coating on a surface of the final annealed sheet, wherein
the slab contains 0.005 mass % to 0.20 mass % of P, and an annealing temperature in the final annealing is set to 1100° C. or higher,
the insulating coating is formed by applying a solution containing one part by mass or more of a phosphoric acid compound, and
a siliconizing treatment is performed after the final annealing, or the final annealing is final annealing that also serves as a siliconizing treatment.

13. The method according to claim 12, wherein the cold rolling is performed using a rolling oil containing 1% or more of a phosphoric ester-type emulsifier.

14. The method according to claim 12, wherein after the cold rolling and before the final annealing, an aqueous solution containing 5 parts by mass or more of a phosphoric acid compound is applied on a surface of the steel sheet that has undergone the cold rolling, and the aqueous solution is dried.

15. The method according to claim 13, wherein after the cold rolling and before the final annealing, an aqueous solution containing 5 parts by mass or more of a phosphoric acid compound is applied on a surface of the steel sheet that has undergone the cold rolling, and the aqueous solution is dried.

\* \* \* \* \*